United States Patent [19]

Aiba et al.

[11] Patent Number: 5,078,485
[45] Date of Patent: Jan. 7, 1992

[54] TEMPLES FOR EYEGLASSES

[75] Inventors: Mitsuru Aiba, Fujisawa; Kounosuke Yamauchi, 2-13-31, Kitayotsui, Fukui City, Fukui Prefecture; Toshihiro Yoshida, 4-4-17, Asahimachi, Sabae City, Fukui Prefecture, all of Japan

[73] Assignees: Kanto Special Steel Works, Ltd., Fujisawa; Kounosuke Yamauchi, Fukui; Toshihiro Yoshida, Sabae, all of Japan

[21] Appl. No.: 535,028

[22] Filed: Jun. 8, 1990

[30] Foreign Application Priority Data

Jun. 12, 1989 [JP] Japan ................ 1-67302[U]

[51] Int. Cl.$^5$ .................. G02C 5/16; G02C 5/18; G02C 5/14
[52] U.S. Cl. .................... 351/114; 351/117; 351/122
[58] Field of Search ............... 351/117, 118, 41, 111, 351/114, 122; 2/448, 449, 450

[56] References Cited

U.S. PATENT DOCUMENTS 4,472,035 9/1984 Takamura et al. .............. 351/117

Primary Examiner—Rodney B. Bovernick
Attorney, Agent, or Firm—Wenderoth, Lind & Ponack

[57] ABSTRACT

An eyeglass temple has an arm whose forward end is connected to one of a pair of eyeglasses or to one end of a rim holding a pair of eyeglasses and an earpiece continuing from the rear end of the arm is made up of a plastic temple proper and a core buried in the plastic temple proper so as to extend in the direction of its length. A portion of the metal core buried in the arm has extra-high elasticity, whereas a portion in the earpiece has plasticity.

4 Claims, 1 Drawing Sheet

TEMPLES FOR EYEGLASSES

BACKGROUND OF THE INVENTION

1. Field of the Invention

This invention relates to temples for eyeglasses and more particularly to plastic temples with metal cores.

2. Description of the Prior Art

Frames for eyeglasses can be broadly classified into plastic frames and metal frames. Plastic frames are colorful and give a substantial feeling because they can be readily tinted and formed into desired colors and shapes. Low in strength, however, plastic frames are usually reinforced with metal cores buried therein. By contrast, metal frames are strong but less fashionable because they are neither colorful nor adequately substantial. As such, metal frames are inferior to plastic frames except where lightness, thinness and/or shortness are sought.

The temples, especially the arms, which make up the side supports of a pair of glasses, must be elastic enough to apply an appropriate pressure on the temples of a person who wears glasses. The temples must thus engage the face with an appropriate amount of springy force from both sides thereof. It is important that the temples can be adjusted to the satisfaction of the wearer. But metal and plastic temples are very rigid, as exemplified by curves 2 and 3 in FIG. 3, which shows the relationship between the bending angle and force in a three-point bending test. Accordingly, plastic frames with buried metal cores are so rigid that the pressure they exert on the temples of wearers changes greatly even when the temples are only slightly bent. As a consequence, their fitting pressure tends to become greater or smaller than appropriate, causing an unpleasant feeling on the part of the wearer.

SUMMARY OF THE INVENTION

The object of this invention is to provide highly fashionable temples for eyeglasses that are comfortable to wear.

An eyeglass temple according to this invention comprises a temple of plastic and a metal core of extra-high elasticity buried in the plastic. The metal core has extra-high plasticity in the straight arm portion of the temple and plasticity in the curved earpiece.

Metals having extra-high elasticity, such a Ni-Ti and Cu-Zn-Al alloys, are used as the core.

The cross-sectional ratio of the metal core to the plastic in the arm portion of the temple should preferably be between 5 and 80%. Under 5%, the characteristics of the plastic suppress the extra-high elasticity of the metal core. Over 80%, the temple becomes closer to being a metal one, thereby lessening the fashionableness and substantialness characteristics of the plastic temple.

Different properties can be imparted to the metal core in the arm portion and earpiece by applying different heat treatments. When heated to 600° C. or above, the core of an Ni-Ti alloy, for example, becomes annealed, losing its extra-high elasticity and acquiring plasticity. Therefore, the desired plasticity can be imparted to the core of an Ni-Ti alloy in the earpiece only by annealing the core in that portion at 600° C. or above by passing electric current thereto.

The elasticity of the metal core is so high that the characteristic elasticity of the eyeglass temple according to this invention is not lost as a result of combination with the covering plastic. Therefore, the eyeglass temples of this invention are as soft and elastic as the metal temples, without losing the substantialness, colorfulness and fashionableness inherent in plastic temples.

DESCRIPTION OF THE PREFERRED EMBODIMENTS

Figure 1A:
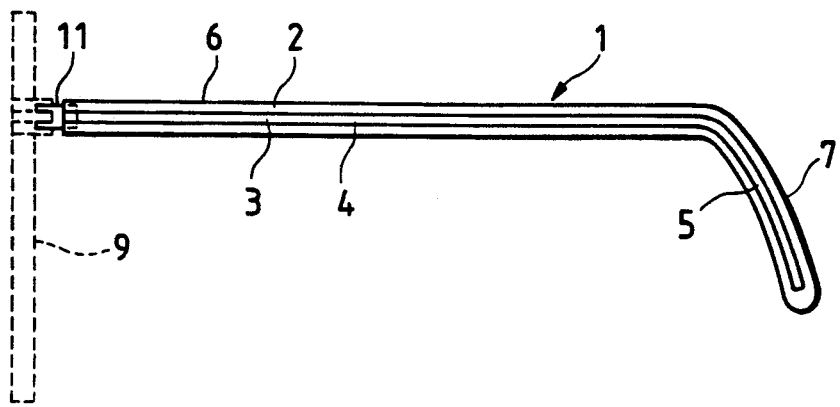
FIG. 1 shows an eyeglass temple according to the present invention, (a) being a side elevation and (b) being a cross-sectional view.
Figure 1B:

As shown in FIGS. 1(a) and 1(b), an eyeglass temple 1 comprises a plastic temple proper 2 and a core 3 of Ni-Ti alloy. One end of the temple 1 is connected to a rim 9 by a hinge 11. A pair of glasses (not shown) are fitted in the rim 9. The core 3 is divided into a portion 4 corresponding to the arm 6 of the temple 1 and a portion 5 corresponding to an earpiece 7. While the portion 4 corresponding to the arm has extra-high elasticity, the portion 5 corresponding to the earpiece exhibits plasticity.

The illustrated temple was made as described below.

Figure 2A:
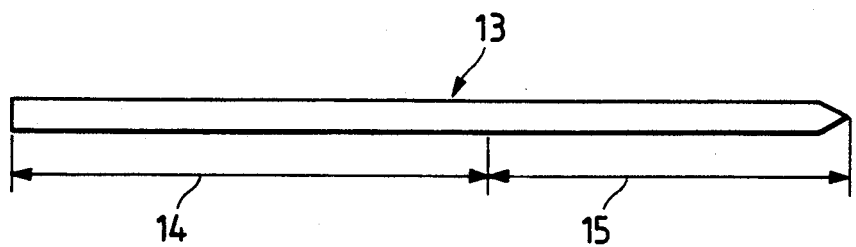
FIG. 2 shows a semi-finished core of any eyeglass temple, (a) being a side elevation and (b) being a cross-sectional view.
Figure 2B:

An Ni-Ti alloy consisting of 50.8 atomic percent of nickel and the remaining percent of titanium was cold-formed into a flat wire 0.8 mm by 2.0 mm in cross section. A semi-finished piece 13 was prepared by cutting the flat wire to a length of 140 mm, as shown in FIGS. 2(a) and 2(b). A heat treatment to impart extra-high elasticity was applied to the semi-finished piece 13 held straight in an electric furnace at 500° C. for 30 minutes. To impart plasticity to the earpiece portion while maintaining the extra-high elasticity in the arm portion 14 (90 mm long), a portion 15 (50 mm long) of the semi-finished piece 13 corresponding to the earpiece alone was annealed by heating to a temperature or 700° C. by passing electric current therethrough. A hinge was secured to one end of the metal core thus prepared. Then the metal core was heated and inserted into a piece of plastic, having a cross section of 4 mm by 6 mm and a length of 150 mm, made from an acetate sheet. The obtained piece was finished to the temple 1 by machining, polishing and bending.

The temple attached to a conventional rim gave a much better feeling to the wearer than temples of the conventional type.

Figure 3:
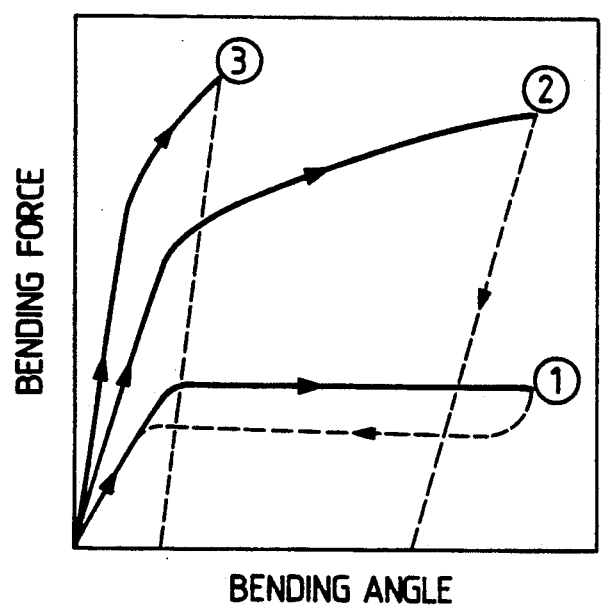
FIG. 3 shows the relationship between the bending angle and bending force of the plastic and metal core.

The metal core in the arm portion of the eyeglass temple according to the present invention has extra-high elasticity. Therefore, when the bending angle exceeds a certain point, an increase in the bending force relative to the bending angle becomes close to 0, as indicated by curve (1) in FIG. 3. Having an elastic limit nearly 20 times higher than pure titanium, a Ni-Ti alloy, for example, regains the original shape even after heavy deformation. Therefore, a temple made of a combination of plastic and a highly elastic metal maintains its initial condition for a long time without requiring fine fitting adjustment. The temples of this type according to the present invention, therefore, always fit with a constant pressure, irrespective of the shape and size of the wearer's face. The earpiece can be freely bent to fit the shape and size of the wearer's face because the metal core in the earpiece is plastic.

The eyeglass temples according to the present invention are by no means limited to the preferred embodiment just described. For example, temples according to the present invention may be of the type that are hinged not to a rim but to a pair of glasses.

What is claimed is:

1. An eyeglass temple comprising; an arm having a forward end adapted to be connected to one of a pair of eyeglasses or to one end of a rim holding a pair of eyeglasses; and an earpiece extending from the rear end of said arm, said arm and said earpiece being made of plastic and a metal core of an alloy taken from the group consisting of Ni-Ti alloy and Cu-Zn-Al alloy, said metal core being embedded in said plastic and extending in the diretion of the length of said temple, said metal core consisting of a first portion coextensive with said arm and having been heat treated so as to have extra-high elasticity, and a second portion coextensive with said earpiece and having been heat treated so as to have plasticity.

2. An eyeglass temple according to claim 1, in which the ratio by cross-sectional area of the metal core to the plastic in the arm of the temple is between 5 and 80%.

3. An eyeglass temple according to claim 1, in which only the second portion of the metal core is annealed.

4. An eyeglass temple according to claim 3, in which only the second portion of the metal core has been annealed by passing electric current therethrough.

* * * * *